March 11, 1958 N. POFFENBERGER 2,826,045
FREEZING APPARATUS
Filed Oct. 29, 1954 2 Sheets-Sheet 1
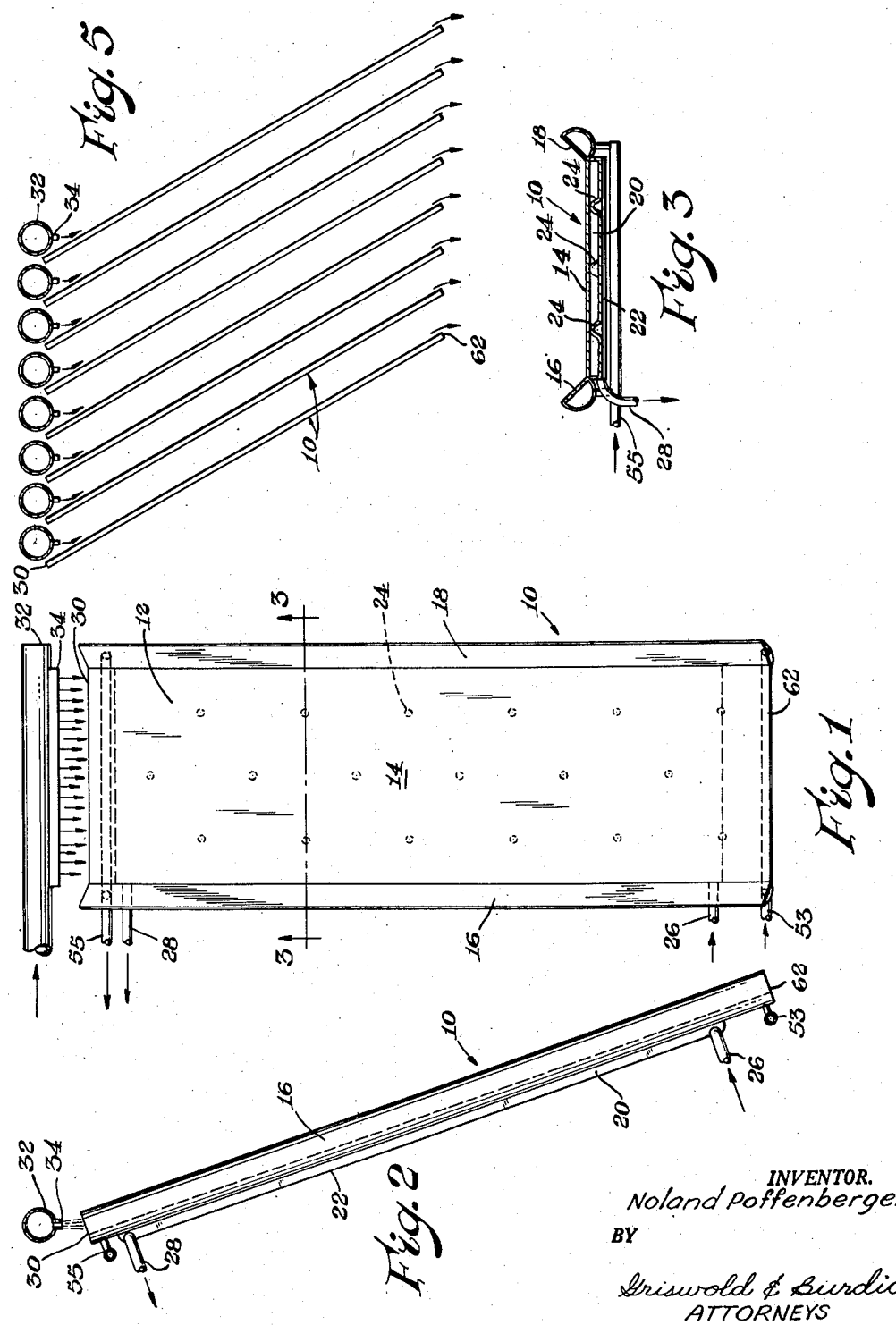
INVENTOR.
Noland Poffenberger
BY
Griswold & Burdick
ATTORNEYS

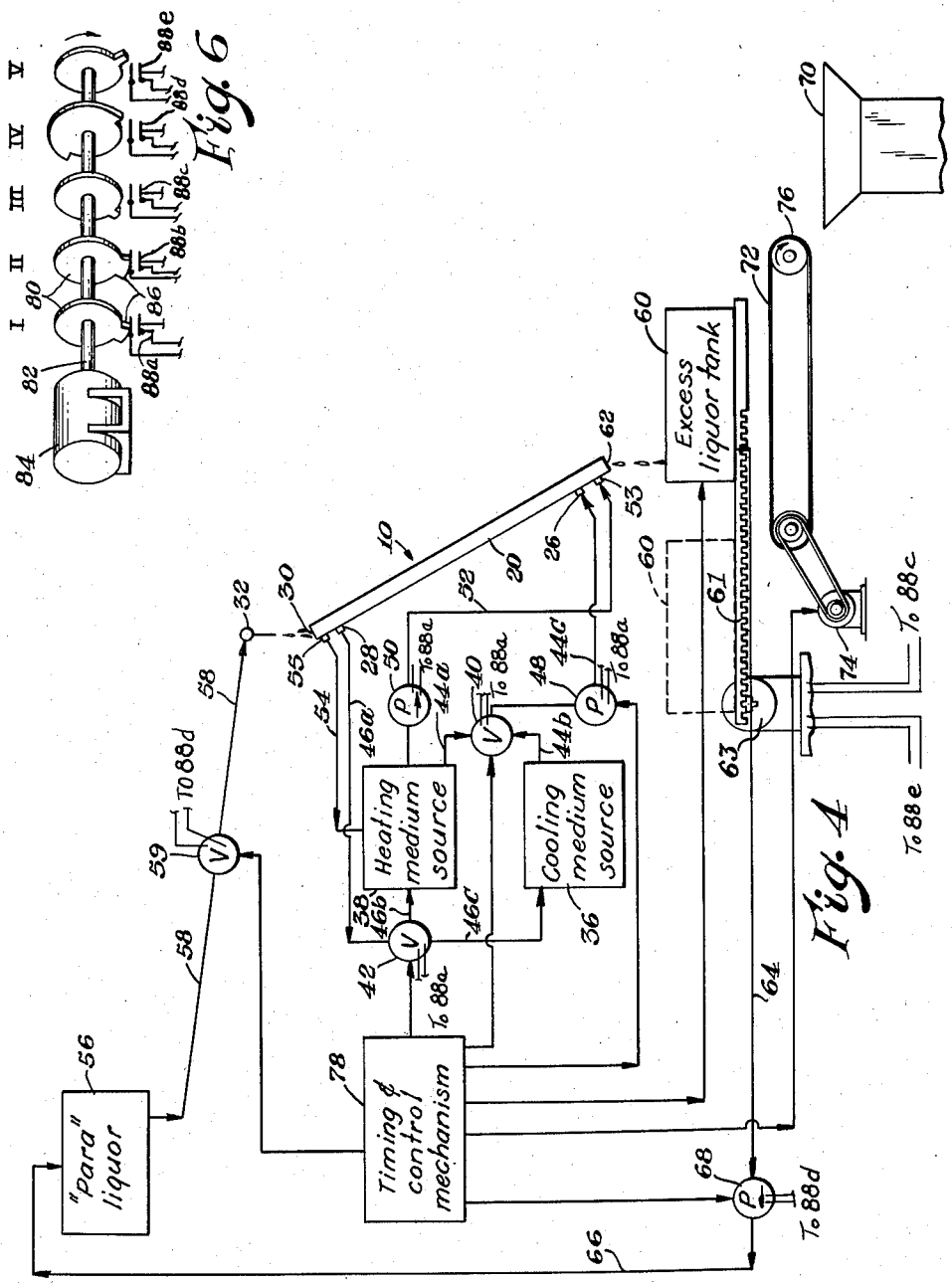

United States Patent Office 2,826,045
Patented Mar. 11, 1958

2,826,045

FREEZING APPARATUS

Noland Poffenberger, Midland, Mich., assignor to The Dow Chemical Company, Midland, Mich., a corporation of Delaware Application October 29, 1954, Serial No. 465,584

4 Claims. (Cl. 62—7)

This invention relates to means for freezing chemical compounds into large cakes, and particularly to freezing apparatus for producing cakes or lumps of paradichlorobenzene.

It is frequently desirable to produce chemical compounds in lump form in large quantities. A particular example of such a compound is paradichlorobenzene, although other materials often present the same problems.

Paradichlorobenzene, a material used in making moth flakes and disinfectant cakes, is desired in the form of lumps, such as one-half inch cubes, for many purposes. One of the long established methods of making such lumps is to freeze the material in a conventional rectangular ice can, melt the layer of the frozen cake which is next to the can walls to allow the cake to be removed from the can, and then cut or break up the large cakes. This method is effective, but the output of a unit can is low and the labor to handle the process is considerable.

A more recent process is to use vertical tubes in which the cake is first frozen on the wall and then the tube is quickly heated to melt the layer of the cake which is contiguous to the tube wall, permitting the tube of solid paradichlorobenzene to slide out by gravity. This tube freezing device is used for ice production and is known commercially as a "Tube Ice" machine. The machine has good capacity, can be mechanized, and has low labor requirements for its operation.

However, when paradichlorobenzene is produced in such a machine, the product is inferior because the lumps formed are weak and because a large number of "fines" or small granules are produced when tubular cakes of paradichlorobenzene are broken into lumps.

One factor which contributes to the weakness of the lumps of paradichlorobenzene produced by the tube ice machine process is the presence of a fracture line which tends to be concentric with the curved surface of the product and located about one-quarter inch in from the outer or tubular surface of the product. When the product is broken into lumps, the fractures tend to cause the lumps to be of smaller diameter than the desired one-half inch size. The distance the fracture line lies from the inside diameter of the tube is a function of the diameter of the tube. If large diameter tubes are used to insure that the fracture line is far enough away from the surface, the mass of the frozen product is so great that the product is shattered as it drops from the tube ice machine.

Accordingly, a principal object of this invention is to provide an improved freezing apparatus for producing lumps or cakes of chemical compounds.

Another object of this invention is to provide an improved apparatus for producing lumps or cakes of paradichlorobenzene.

In accordance with this invention there is provided freezing apparatus comprising at least one freezing plate having a freezing channel including an intake end and a discharge end, said channel having a substantially planar bottom and having sides extending upwardly from two opposite edges thereof. Means are provided for applying a cooling or heating medium to the bottom of said channel and for applying a heating medium to said sides. Means are also provided for introducing a stream of liquid feed to be frozen at periodic intervals into the intake end of said channel. A tank is disposed adjacent to the discharge end of said channel for recovering any liquid which is discharged from said channel, the tank being adapted to be readily removed from adjacent to the discharge end of said channel at predetermined intervals. Liquid to be frozen is pumped to said feed means. The freezing apparatus includes timing and control means for causing said cooling medium to be applied to the bottom of said channel while said stream of feed is applied thereto and for controlling the heating of said bottom and sides of said channel while said stream of feed is shut off.

The present invention, as well as additional objects and advantages thereof, will best be understood when the following detailed description is read in connection with the accompanying drawings, in which:

Fig. 1 is an elevational view of an inclined freezing plate adapted to be used in this invention;

Fig. 2 is a side elevational view of the freezing plate shown in Fig. 1 showing schematically the means for distributing the fluid to be cooled and frozen on said plate;

Fig. 3 is a sectional view taken along the lines 3—3 of Fig. 1;

Fig. 4 is a schematic view of freezing apparatus in accordance with this invention;

Fig. 5 is a schematic view of an array of freezing plates of the type illustrated in Figs. 1, 2, and 3 and adapted for use in the freezing apparatus shown in Fig. 4, and Fig. 6 is a diagrammatic view of a timing and control mechanism suitable for use with this invention.

Referring to Figs. 1, 2, and 3, there is shown a freezing plate 10 having a liquid flow channel 12 on the upper surface part thereof, the channel being defined by the top sheet 14 of the freezing plate 10 and the sides 16, 18 which extend outwardly and upwardly therefrom. The sides 16, 18 of the channel 10 are hollow and are adapted to have a heating medium, such as hot water, for example, circulated therethrough.

The top sheet 14 of the freezing plate 10 may be heated or cooled by means of a jacket 20 which is affixed to its underside, or by other suitable means. The jacket 20 conveniently is composed of a rectangular box-like structure having its sides and ends secured to the underside of the top sheet 14 of the freezing plate 10. The bottom 22 of the jacket 20 has a number of upwardly extending hemispherically shaped spacers or dimples 24 which support the top sheet 14 of the freezing plate 10. Inlet and outlet means 26, 28 respectively, for the cooling or heating medium, shown as pipes, are provided in the jacket 20.

In use, the individual freezing plates 10 are usually mounted obliquely as shown in Figs. 2 and 5, and in an array comprising several plates. Such an array is shown schematically in Fig. 5. The material to be frozen (paradichlorobenzene liquor, for example) is sprayed or flowed into the freezing channel 12 from the upper or intake end 30 of the plate 10 from a fluid distribution unit 32. Usually the fluid distribution unit 32, which is illustrated as an elongated pipe section having a slit-like nozzle 34 adapted to "squirt" a sheet of fluid therefrom, is separate from the freezing plate 10. The fluid distribution unit may, however, be included as an integral part of the freezing plate structure. The top sheet 14 of the freezing plate 10 is usually made of thin metal in order to have thermal properties which facilitate a rapid change from cooling to heating of the cake of paradichlorobenzene during the operation of the plate and during the recycling of the freezing apparatus. The numerous "dimples" or indentations 24 of the bottom 22 of the jacket 20 provide mechanical support to the thin top sheet 14 to maintain the top sheet 14 as a substantially planar surface over which the liquid to be frozen is flowed.

Freezing apparatus in accordance with one embodiment of this invention is shown schematically in Fig. 4. The apparatus would, in practice, use an array of freezing plates 10, such as are illustrated (by way of example) schematically in Fig. 5. However, a single freezing plate 10 has been shown in Fig. 4 for the sake of simplicity in the drawings.

The freezing apparatus includes, in addition to the obliquely mounted freezing plate 10, a source of a cooling medium 36 (cold water, for example), a source of heating medium 38 (hot water, for example), valve means 40, 42 for regulating the flow of the heating and cooling media through the pipes to (44a, b, c) and from (46a, b, c) the jacket 20 of the freezing plate 10, and a pump 48 for circulating the cooling or heating medium through the jacket 20 of the freezer plate 10. A separate pump 50 is provided for circulating heating medium from the heating medium source 38 through the pipes 52, 54 to the inlet 53 and outlet 55 of the hollow sides 16, 18 of the freezing plate 10.

A tank 56 or other source of material to be frozen (such as paradichlorobenzene) is connected to a distribution unit 32 above the freezing plate by a pipe or hose 58 which contains a valve 59. A pump (not shown) may be used between the tank 56 and distribution unit 32 to provide additional pressure at the nozzle 34 of the distribution unit 32 if needed.

A second or excess liquor tank 60 is mounted in a retractable manner on a track 61 below the discharge end 62 of the freezing plate. A motor 63, coupled to the track 61 and to the switches 88c and 88e is utilized to move the excess liquor tank 60 in accordance with the operational requirements of the apparatus. The excess liquor tank 60 is connected to the "para" liquor reservoir tank 56 through pipes 64, 66 and a pump 68.

A hopper 70 is disposed below and slightly to one side of the discharge end of the freezing plate 10. An endless type belt 72 is disposed below the discharge end 62 of the freezing plate 10. The belt 72, driven by the motor 74, is mounted horizontally, having its discharge end 76 over the hopper 70.

A timing and control mechanism 78 is provided for sequentially operating the pumps 48, 68, the valves 40, 42 used to circulate the cooling and heating medium through the jacket 20 of the freezing plate 10, and for controlling the movement of the excess liquor tank 60 and the belt 72.

In simple form, the timing and control mechanism 78 may, as shown in Fig. 6, comprise a plurality of cams 80 mounted on a rotatable shaft 82 (driven by a gear-reduced motor 84). A single rotation of the shaft 82 constitutes an operating cycle of the freezing apparatus. An actuator 86 extends from the surface of each cam. The actuators hold closed contacts on switches 88 at intervals during the rotation of the shaft 82. The switches 88 control in sequence the operation of the valves, motors, etc. mentioned above. The actuators 86 shown in Fig. 6 are illustrative only and are not intended to indicate the exact time intervals of the freezing apparatus. However, the cam I may control the heating and cooling fluid cycle, cam II the belt, cam III the retraction of the excess liquor tank 60, cam IV the operation of the valve 59 in the "para" line 58 and the operation of the pump 68, while cam V controls the advancement of the excess liquor tank 60.

In the operation of the freezing apparatus, the production cycle starts with the cooling medium (at about 30° C.) being circulated through the jacket 20 of the freezing plate 10 and "para" liquor running down (as a sheet) the slanting channel or top surface 12 of the freezing plate 10. The excess or unfrozen "para" liquor flows off the discharge end 62 of the freezing plate 10.

It has been found to be advisable to continuously heat the sides 16, 18 of the freezing channel 12 in order to prevent the frozen cakes from adhering thereto.

After a cake of paradichlorobenzene of the desired thickness is frozen onto the surface of the freezing channel 12, the flow of "para" liquor is cut off and the second or "excess" liquor tank 60 is retracted away from the discharge end 62 of the freezing plate 10. The circulation of the cooling medium, which may be water, for example, is continued for a time at a temperature of about 15° C. to insure that the cake of frozen paradichlorobenzene on the freezing plate 10 is completely hardened.

The valves 40, 42 controlling the flow of the cooling and heating mediums (which may be cool water and warm water respectively, for example) are then adjusted to circulate the heating medium (at about 60° C.) through the jacket 20 of the freezing plate 10. When the heating medium is circulated, the movable belt driving mechanism 74 is energized, and the cakes of paradichlorobenzene, which have been loosened from the surface of the freezing plate by the rising of the surface temperature of the top sheet 14 above the melting point of paradichlorobenzene, fall onto the belt 72 and then are transported into the hopper 70. The belt 72 is located far enough below the freezing plates to permit the loosened frozen cakes to fall onto it and tend to stack themselves on it. The moving belt 72, however, prevents undue shattering of the "para" cakes which would occur if they fell directly from the freezing plate 10 into the hopper 70. The moving belt 72 is also advantageous when an array of freezing plates 10, such as are shown schematically in Fig. 5, are used in the freezing apparatus, since all the cakes may then be dropped into the hopper 70 at one time and hit at one spot on the hopper wall. Also, the use of the belt 72 permits the use of a much smaller hopper than could be otherwise used where several freezing plates were stacked as an array.

After the cakes of frozen paradichlorobenzene have been removed from the freezing plate or plates 10, the plates 10 are again cooled. The second or excess liquor tank 60 is again moved into position below the discharge end 62 of the freezing plate 10 and "para" liquor is flowed down the freezing channel 12 to repeat the freezing and thawing cycles.

As previously mentioned, in practice an array of freezing plates 10 such as are shown in Fig. 5 comprise part of the freezing apparatus of the invention. A typical array comprises a series of 20 metal freezing plates 10, each having 4 ft. by 12 ft. planar surfaces. The freezing plates 10 are mounted obliquely in parallel relationship. The plates 10 are separated about 6 in. from each other and inclined at an angle of about 60 degrees with the horizontal. The hollow sides 16 of each freezing plate 10 are about 2 inches wide and are inclined at an angle of 60 degrees to the top sheet 14 of the plate.

An advantage of having such an array of freezing plates is that the top of the cake of paradichlorobenzene on one plate is cooled by convection or radiation to the jacket 20 of an adjacent freezing plate.

While heating the jacket of the freezing plate has been described as the means for removing the cake from the freezing plate, other means could be used. The "para" cake is, in practice, not frozen solidly to the bottom channel surface, but adheres tightly thereto only at a few points. The cake may be caused to drop off an inclined freezing plate by mechanically flexing the sheet forming the bottom of the channel. Flexing of the bottom of the channel 12 may conveniently be accomplished by momentarily closing a valve in the outlet line for the cooling medium while continuing to pump the cooling medium into the jacket. Such a procedure for discharging "para" cakes from the freezing plates 10 may result in undue mechanical stresses in the freezing plate structure, and this should be taken into consideration when the unit is designed.

By freezing the paradichlorobenzene on a flat surface, the fracture lines which have been characteristic of product made in prior machines are eliminated. The flat "para" cakes are usually about ½ inch thick, and require no slicing as do cakes of paradichlorobenzene produced in conventional ice machines in which the product is more in the form of a block than in cake form. Since the freezing apparatus of this invention may be automatically controlled by the timing and control mechanism, the labor required in the operation of the apparatus is mainly that needed to remove and package the product which falls into the hopper and thence goes to a storage bin.

It should be recognized that while the freezing apparatus of this invention has been described in connection with paradichlorobenzene, other chemicals may be frozen and/or purified in a similar manner.

While cool and warm water have been mentioned as the cooling and heating media, other substances, solid, liquid, or gaseous in form may be used. Alternatively, the top sheet 14 could be heated to loosen the frozen cake of paradichlorobenzene by passing a large electric current therethrough at the time the cake is to be discharged from the freezing plate 10.

I claim:

1. Apparatus for freezing an organic material, said freezing apparatus comprising at least one inclined freezing plate having a freezing channel including an intake end and a discharge end, said channel having a substantially planar bottom and having sides extending upwardly from two opposite edges thereof, means for alternately cooling and heating the bottom of said channel, means for continuously heating said sides, means for introducing at periodic intervals at the intake end of said channel a stream of liquid feed to be frozen, tank means adjacent to the discharge end of said channel for recovering liquid which is discharged from said channel, and timing and control means for selectively controlling the cooling and heating of the bottom of said channel.

2. Freezing apparatus for materials which contract upon freezing, comprising a plurality of similarly shaped inclined freezing plates each having a freezing channel including an intake end and a discharge end, said channel having a substantially planar bottom and having sides extending upwardly from said planar bottom, means including a fluid tight jacket secured to each freezing plate for alternately cooling and heating the bottom of each channel, means for continually heating said sides during the operation of said apparatus, means for introducing at periodic intervals a stream of liquid feed to be frozen at the intake end of said channel, tank means adjacent to the discharge end of said channel for recovering liquid which is discharged from said freezing channel, timing and control means for cyclically controlling the means for alternately cooling and heating the bottom of the freezing channel, and means for introducing a stream of feed.

3. Freezing apparatus for materials which contract upon freezing, comprising at least one inclined freezing plate having a freezing channel including an intake end and a discharge end, said channel having a substantially planar bottom and having sides extending upwardly from two opposite edges thereof, means for alternately cooling and heating the bottom of said channel, means for continuously heating said sides, means for introducing at periodic intervals at the intake end of said channel a stream of liquor feed to be frozen, means adjacent to the discharge end of said channel for recovering liquid which is discharged from said channel, and timing and control means for selectively controlling the cooling and heating of the bottom of said channel.

4. Freezing apparatus for materials which contract upon freezing, comprising at least one inclined freezing plate having a freezing channel including an intake end and a discharge end, said channel having a substantially planar bottom and having sides extending upwardly from two opposite edges thereof, means for alternately cooling and heating the bottom of said channel, means for continuously heating said sides, means for introducing at periodic intervals at the intake end of said channel a stream of liquid feed to be frozen, and means for recovering liquid which is discharged from said channel and for recirculating said liquid over said channel.

References Cited in the file of this patent

UNITED STATES PATENTS

| | | |
|---|---|---|
| 162,397 | Martin | Apr. 20, 1875 |
| 706,510 | Barrath | Aug. 12, 1902 |
| 2,387,899 | Gruner | Oct. 30, 1945 |
| 2,444,514 | Kubaugh | July 6, 1948 |
| 2,613,511 | Walsh | Oct. 14, 1952 |
| 2,682,155 | Ayres | June 29, 1954 |
| 2,755,506 | Weber | July 24, 1956 |